United States Patent
Tani et al.

(10) Patent No.: US 6,956,349 B2
(45) Date of Patent: Oct. 18, 2005

(54) MOTOR DRIVE APPARATUS

(75) Inventors: Hideji Tani, Hashima-gun (JP); Seiji Morino, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/829,233

(22) Filed: Apr. 22, 2004

(65) Prior Publication Data
US 2004/0234402 A1 Nov. 25, 2004

(30) Foreign Application Priority Data

May 23, 2003 (JP) .............................. 2003-146260
Mar. 5, 2004 (JP) .............................. 2004-062712

(51) Int. Cl.[7] ............................................. G05B 11/28
(52) U.S. Cl. ...................... 318/599; 318/254; 318/138; 318/439; 318/432; 388/907.2
(58) Field of Search ................................ 318/254, 138, 318/439, 599, 432–434; 388/907.2

(56) References Cited

U.S. PATENT DOCUMENTS 5,818,178 A * 10/1998 Marumoto et al. ......... 318/254
5,936,378 A * 8/1999 Iijima et al. ................ 318/807
6,012,437 A * 1/2000 Radhamohan et al. . 123/568.23
6,049,194 A * 4/2000 Nakagawa et al. ........... 322/20
6,326,753 B1 * 12/2001 Someya et al. ............. 318/471
6,771,040 B2 * 8/2004 Kusumoto et al. .......... 318/801

FOREIGN PATENT DOCUMENTS

| JP | 4-105906 | 4/1992 |
| JP | 5-308794 | 11/1993 |
| JP | 11-324625 | 11/1999 |

* cited by examiner

Primary Examiner—Rina Duda
(74) Attorney, Agent, or Firm—Nixon & Vanderhye P.C.

(57) ABSTRACT

A valve opening and closing control device of a type making use of a motor enhances driving performance of the motor and restricts heat generated by constituent elements. A bridge circuit of a motor driving circuit comprises three rows of arms comprising two switching elements connected in series to each other and two diodes connected in parallel to corresponding switching elements. The respective arms are connected in parallel to an electric source, and motor windings are connected to points of interconnection of the switching elements on the respective arms. After putting the respective switching elements of the arms in an ON state to carry an electric current to the windings, a control circuit causes the switching element in an ON state to be put as an electricity introduction stoppage element in an OFF state and causes the switching element of the same arm as that, on which the electricity introduction stoppage element is disposed, to be put in an ON state.

10 Claims, 13 Drawing Sheets

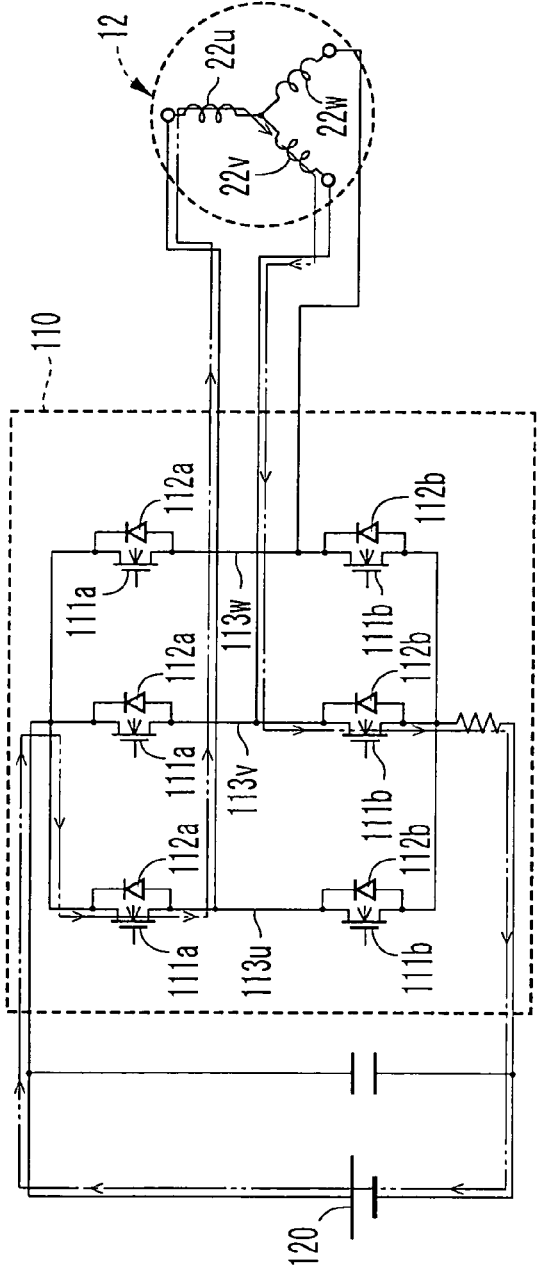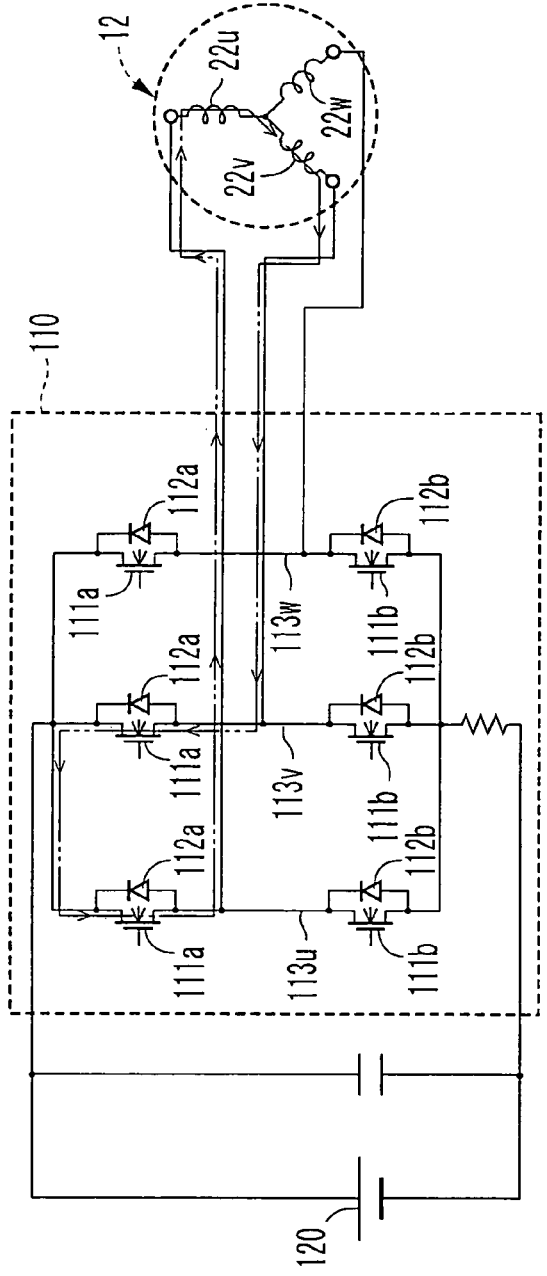
FIG. 1A
FIG. 1B

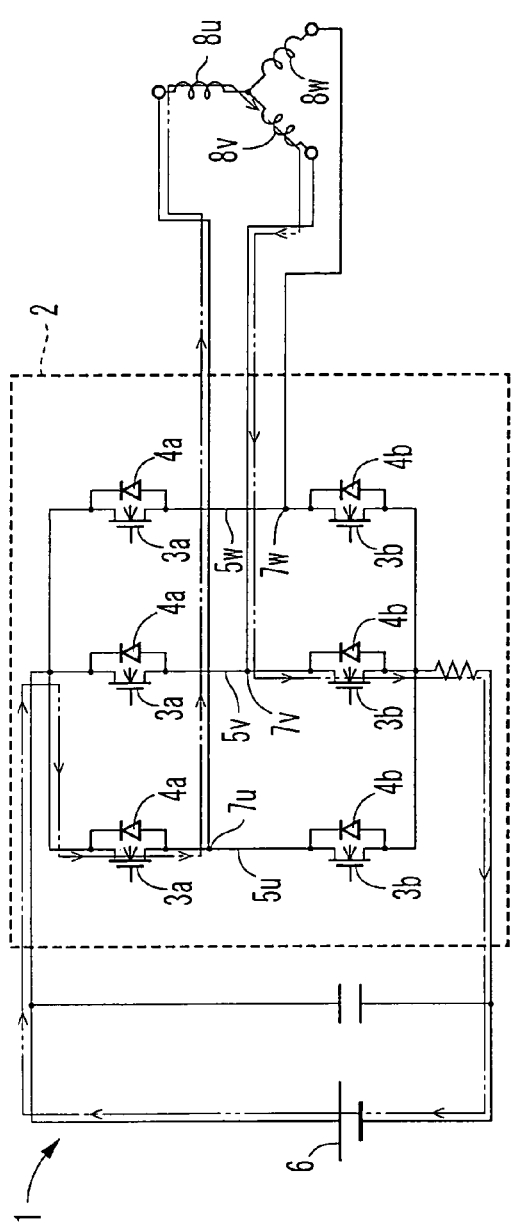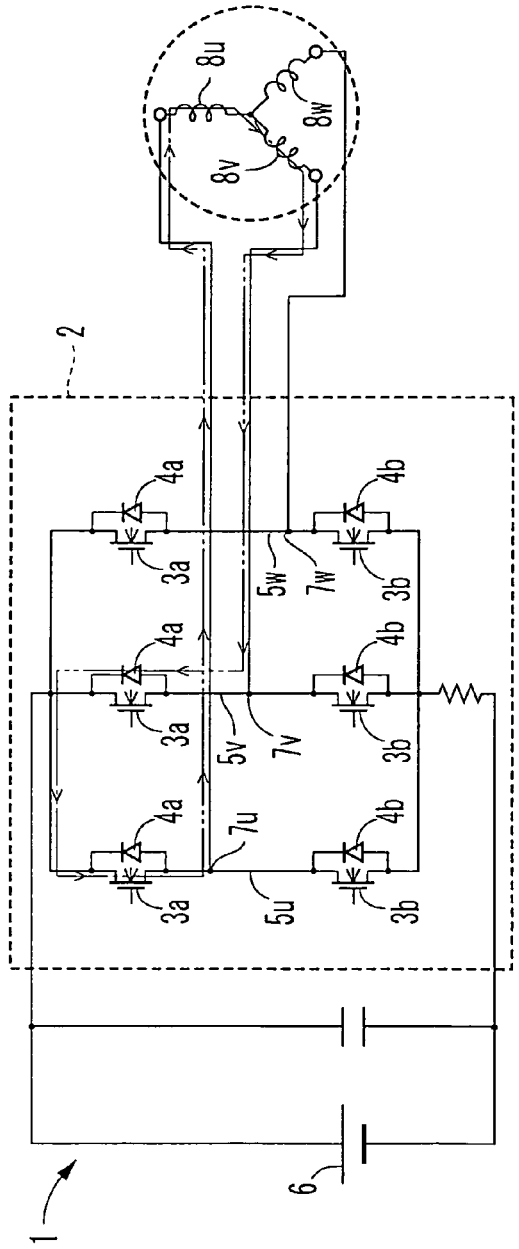
FIG. 15A PRIOR ART
FIG. 15B PRIOR ART

MOTOR DRIVE APPARATUS

CROSS REFERENCE TO RELATED APPLICATIONS

This application is based upon, claims the benefit of priority of, and incorporates by reference the contents of, Japanese Patent Application No. 2003-146260 filed on May 23, 2003 and Japanese Patent Application No. 2004-62712 filed on Mar. 5, 2004.

TECHNICAL FIELD

Exemplary embodiments of the present invention relate to a valve opening and closing control device that controls valve opening and closing of an internal combustion engine by using a rotational torque of a motor driven by a motor drive apparatus.

BACKGROUND

A conventional valve opening and closing control device for regulating valve timing of an engine using a rotational torque of a motor is disclosed in, for example, JP-UM-A-4-105906 (hereafter "Patent Document 1"). Also, a valve opening and closing control device that regulates a maximum valve lift in an engine making use of a rotational torque of a motor is disclosed in, for example, JP-A-11-324625 (hereafter "Patent Document 2").

These control devices require a small sized motor to be able to be mounted on an engine and that the motor be supplied with an electric current of, for example, 20 A or more, preferably, 40 A or more to generate a large rotational torque. A motor drive device 1 for such a control device is shown in FIGS. 15A–15B.

The control device 1 drives a three-phase motor and is provided with a bridge circuit 2 with a motor as a load. The bridge circuit 2 comprises three rows of arms that comprise two switching elements $3a$, $3b$ connected in series to each other and two diodes $4a$, $4b$ connected in parallel to the corresponding switching elements $3a$, $3b$. The respective arms $5u$, $5v$, $5w$ are connected mutually in parallel to an electric source, and respective non-connected terminals of windings $8u$, $8v$, $8w$ of the motor star-connected together are connected to points $7u$, $7v$, $7w$ of interconnection of the two switching elements. $3a$, $3b$ on the respective arms $5u$, $5v$, $5w$. A control circuit (not shown) connected to gates of the respective switching elements $3a$, $3b$ controls ON/OFF of the respective switching elements $3a$, $3b$ to carry an electric current to the windings $8u$, $8v$, $8w$ of the motor. For example, in order to carry an electric current to the windings $8u$, $8v$ as indicated by alternate long and two short dashes lines with arrows in FIG. 15A, the switching element $3a$ on an upper stage side of the arm $5u$ connected to the winding $8u$ and the switching element $3b$ on a lower stage side of the arm $5v$ connected to the winding $8v$ are put in an ON state.

In the motor drive device 1, when, for example, one $3a$ of the two switching elements $3a$, $3b$ of arm 5V is put in an ON state as shown in FIG. 15B in order to carry an electric current to the windings $8u$, $8v$, a circulating electric current as indicated by alternate long and two short dashes lines with arrows in FIG. 15B flows through a path that connects the diode $4a$ connected in parallel to a separate switching element $3a$ on the same arm $5v$ as that, on which the switching element $3b$ is disposed, the switching element $3a$ on the arm $5u$ in an ON state, and the windings $8u$, $8v$. When the circulating electric current flows, residual voltage between the nonconnected terminals of the windings $8u$, $8v$ decreases.

Since voltage drop of a diode is generally in the order of 0.7 V, a large heat loss as large as 28 W is caused when a circulating electric current of, for example, 40 A flows through the diode. In the motor drive device 1 of a valve opening and closing control device of a type making use of a motor, frequency of ON/OFF switching of the switching elements $3a$, $3b$ is high, so that the circulating electric current causes the diodes $4a$, $4b$ to generate much heat. Excessive heat generated by the diodes $4a$, $4b$ incurs failure in constituent elements, such as the switching elements $3a$, $3b$, etc. of the motor drive device 1. Hereupon, when frequency of ON/OFF switching of the switching elements $3a$, $3b$ is made low in order to restrict heat generated by the diodes $4a$, $4b$, the driving performance of the motor and hence the valve opening and closing control performance is degraded.

SUMMARY

It is a feature of exemplary embodiments of the invention to provide a valve opening and closing control device of a type making use of a motor, in which device the driving performance of the motor is enhanced and heat generated by constituent elements is restricted.

According to aspects of the invention, the motor drive apparatus comprises a bridge circuit comprising a plurality of rows of arms that comprises two switching elements connected in series to each other and two diodes connected in parallel to corresponding switching elements. In the bridge circuit, the respective arms are connected in parallel to the electric source, and windings of the motor are connected to points of interconnection of the two switching elements on the respective arms. The control means for controlling ON/OFF of the switching elements puts the switching element on one of the two rows of arms in an ON state to carry an electric current to the windings. After introduction of an electric current, the control means causes an electricity introduction stoppage element that is one of the two switching elements put in an ON state, to be put in an OFF state and causes the separate switching element on the same arm as that, on which the electricity introduction stoppage element is disposed, to be put in an ON state. Thereby, a circulating electric current flows not through the diodes but through the separate switching element on the same arm as that, on which the electricity introduction stoppage element is disposed. Accordingly, since the use of switching elements having a small resistance makes it possible to restrict heat generation of the switching elements caused by the circulating electric current, frequency of ON/OFF switching of the switching elements can be increased. Frequency of ON/OFF switching of the switching elements is increased whereby the driving performance of the motor and hence the valve opening and closing control performance of the valve opening and closing control device is enhanced.

According to an aspect of the invention, the control means puts the separate switching element on the same arm as that, on which the electricity introduction stoppage element is disposed, in an ON state at later timing than that, at which the electricity introduction stoppage element put in an ON state is put in OFF state. Thereby, it is possible to prevent an excess electric current from flowing through the electricity introduction stoppage element to cause failure.

According to another aspect of the invention, after putting the switching element on one of the two rows of arms in an ON state to carry an electric current to the windings, the control means controls ON/OFF of the switching element selected as the electricity introduction stoppage element by means of the pulse-width modulation method. While ON/OFF of the electricity introduction stoppage element as selected is repeated by the pulse-width modulation method, a circulating electric current flows through the separate switching element on the same arm as that, on which the electricity introduction stoppage element is disposed, each time the electricity introduction stoppage element is put in an OFF state. Therefore, a rotational torque of the motor is made variable while heat generated from the switching elements is restricted.

According to a further aspect of the invention, one ends of the respective arms are connected together at a first point of connection, and the other ends of the respective arms are connected together at a second point of connection. And, the respective arms comprise a load resistive element between the switching element directly close to the first point of connection and the first point of connection, and detection means detects an electric current flowing through the load resistive element of the respective arms. Thereby, a circulating electric current flowing through the bridge circuit can be detected. Accordingly, calorific power of constituent elements can be estimated on the basis of, for example, results of detection of the circulating electric current performed by the detection means.

According to a further aspect of the invention, the first point of connection is higher in electric potential than the second point of connection, so that the detection means can detect an excess electric current flowing through the bridge circuit in the case where points of interconnection of the arms are grounded. Accordingly, introduction of an electric current to the motor can be stopped according to, for example, detection of an excess electric current performed by the detection means.

BRIEF DESCRIPTION OF THE DRAWINGS

The above and other objects, features and advantages of exemplary embodiments of the present invention will become more apparent from the following detailed description made with reference to the accompanying drawings. In the drawings:

FIGS. 1A–1B are schematic views illustrating the operation of a motor drive apparatus according to a first exemplary embodiment;

FIGS. 15A–15B are schematic views illustrating the operation of a conventional motor drive apparatus.

DESCRIPTION OF THE NON-LIMITING EXEMPLARY EMBODIMENTS

A plurality of embodiments of the invention will be described below with reference to the drawings.

(First Embodiment)

Figure 2:
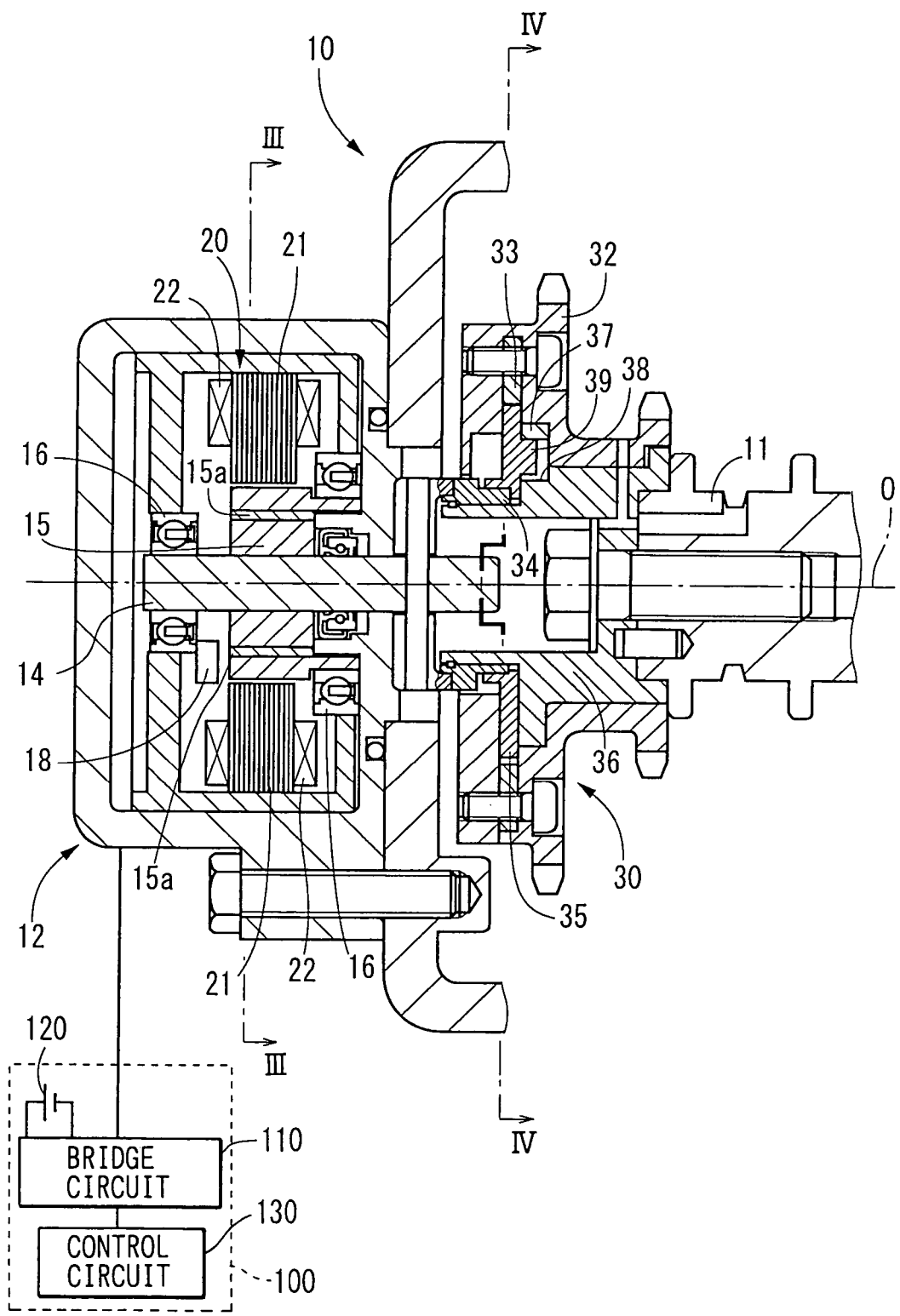
FIG. 2 is a cross sectional view schematically showing a valve timing regulating device according to the first exemplary embodiment.
Figure 3:
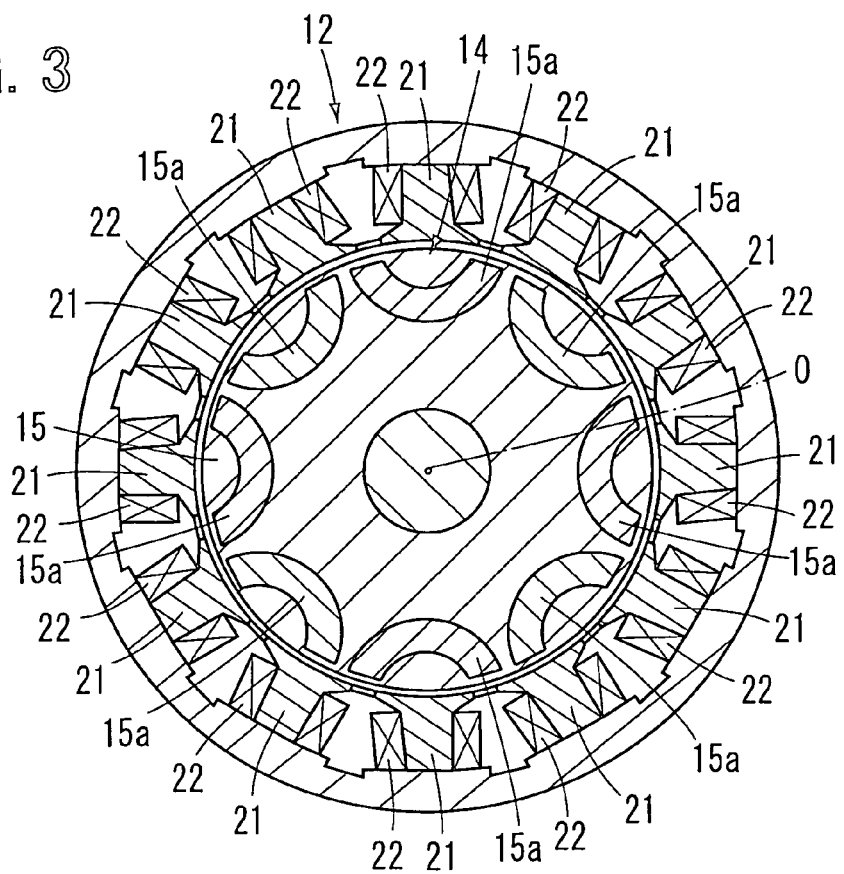
FIG. 3 is a cross sectional view taken along the line III—III in FIG. 2.
Figure 4:
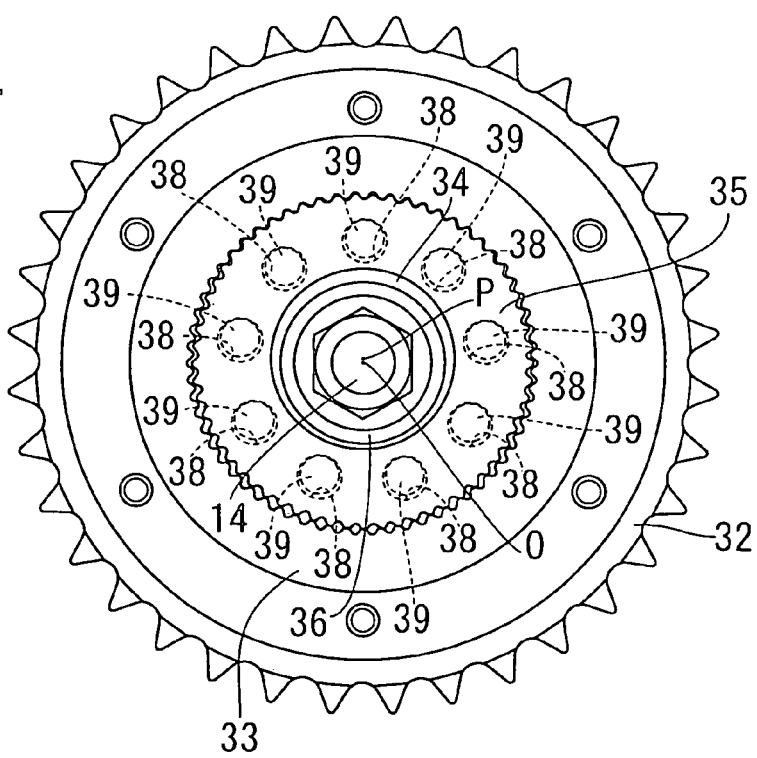
FIG. 4 is a cross sectional view taken along the line IV—IV in FIG. 2.

FIGS. 2 to 4 show a valve timing regulating device as "valve opening and closing control device" according to a first embodiment of the invention. The valve timing regulating device 10 according to the first embodiment is provided in a transmission system that transmits a drive torque of a crankshaft of an engine to a cam shaft 11 of the engine. Making use of a rotational torque of a motor 12 driven by a motor drive apparatus 100, the valve timing regulating device 10 controls opening and closing of intake and/or exhaust valves of the engine to thereby regulate valve timing of the engine.

As shown in FIGS. 2 and 3, the motor 12 of the valve timing regulating device 10 comprises a three-phase brushless motor comprising a rotating shaft 14, bearings 16, a rotating angle sensor 18, a stator 20, etc.

The rotating shaft 14 is supported in two axial positions by the two bearings 16 to be able to rotate about an axis O. The rotating shaft 14 forms a rotor section 15 in the form of a circular disk extending radially outward from a shaft body, and a plurality of magnets 15a are embedded in an outer peripheral wall of the rotor section 15. The rotating angle sensor 18 is arranged in the vicinity of the rotor section 15 to detect a rotating angle of the rotating shaft 14 by sensing the intensity of a magnetic field formed by the respective magnets 15a.

Figure 5:
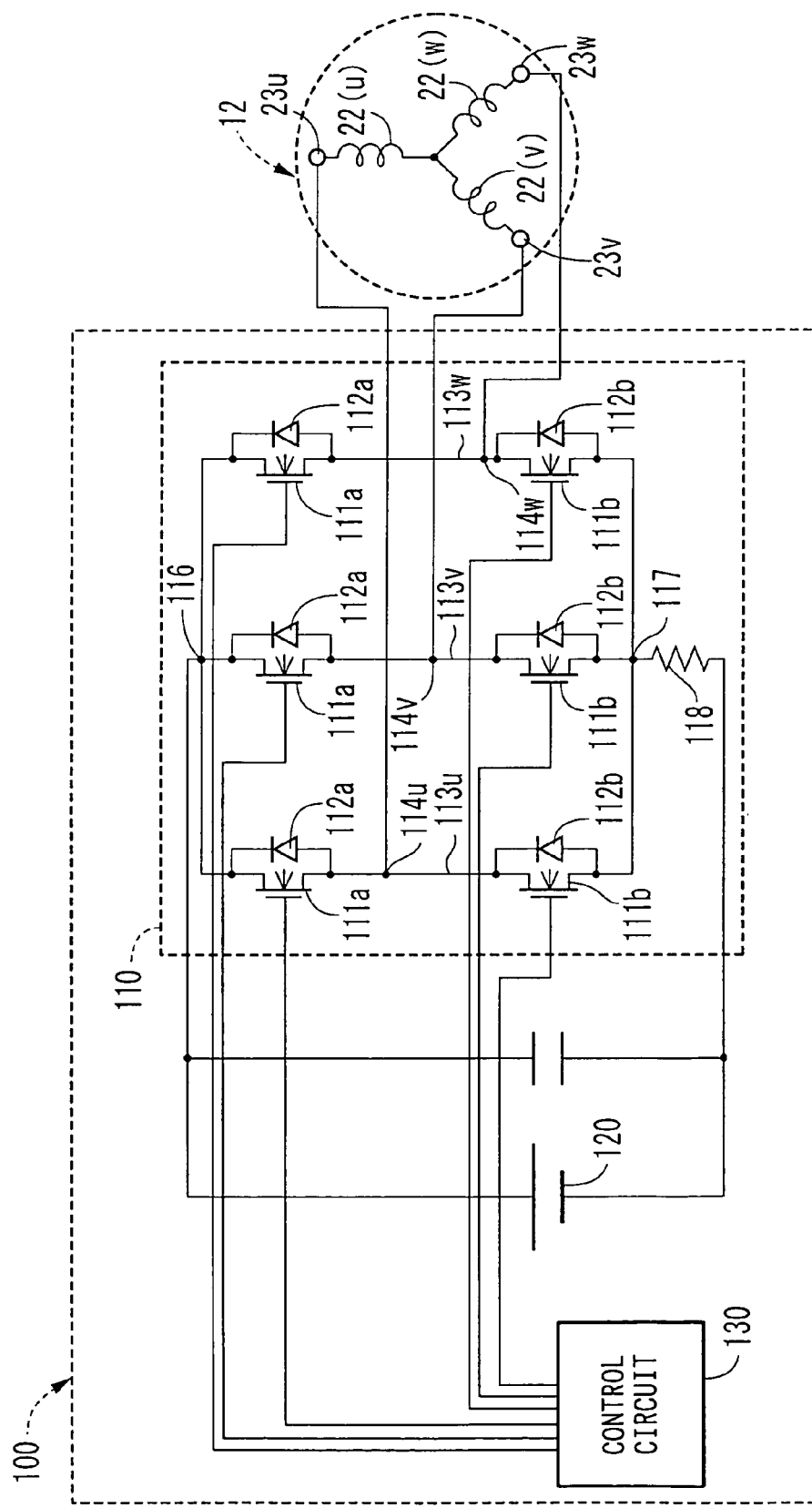
FIG. 5 is a block diagram schematically showing the motor drive apparatus according to the first exemplary embodiment.

The stator 20 is arranged on an outer peripheral side of the rotating shaft 14. A plurality of cores 21 of the stator 20 are aligned at equal intervals around an axis O of the rotating shaft 14. One winding 22 is wound around each core 21. As shown in FIG. 5, the windings 22 in the embodiment are star-connected in sets of three, and respective nonconnected terminals of three windings 22u, 22v, 22w in the same set are connected to a bridge circuit 110 of the motor drive apparatus 100 via terminals 23u, 23v, 23w. Being controlled by the motor drive apparatus 100, the respective windings 22 (22u, 22v, 22w) form on the outer peripheral side of the rotating shaft 14 a rotating magnetic field in a clockwise direction or a counterclockwise direction shown in FIG. 3.

When the rotating magnetic field in the clockwise direction shown in FIG. 3 is formed, the respective magnets of the rotor section 15 are exerted in turn by attraction and repulsion, so that a rotational torque in the clockwise direction shown in FIG. 3 is given to the rotating shaft 14. Likewise, when the rotating magnetic field in the counterclockwise direction shown in FIG. 3 is formed, a rotational torque in the counterclockwise direction shown in FIG. 3 is given to the rotating shaft 14.

As shown in FIGS. 2 and 4, a phase changing mechanism 30 of the valve timing regulating device 10 comprises a sprocket 32, a ring gear 33, an eccentric shaft 34, a planetary gear 35, an output shaft 36, etc.

The sprocket 32 is arranged coaxially on an outer peripheral side of the output shaft 36 to be able to rotate relative to the output shaft 36 around the same axis O as that of the rotating shaft 14. When a drive torque of the crankshaft is input into the sprocket 32 via a chain belt, the sprocket 32 rotates about the axis O in a counterclockwise direction shown in FIG. 4 while maintained in rotational phase relative to the crankshaft. The ring gear 33 comprises an inner gear and is fixed coaxially to an inner peripheral wall of the sprocket 32 to rotate together with the sprocket 32.

The eccentric shaft 34 is connected and fixed to the rotating shaft 14 to be thereby arranged eccentric relative to the axis O whereby it can rotate together with the rotating shaft 14. The planetary gear 35 comprises an outer gear and is arranged on an inner peripheral side of the ring gear 33 to be able to perform planetary movements in such a manner that a part of a plurality of teeth thereof mesh with a part of a plurality of teeth of the ring gear 33. The planetary gear 35 coaxially supported on an outer peripheral wall of the eccentric shaft 34 can rotate relative to the eccentric shaft 34 around an eccentric axis P. The output shaft 36 is fixed coaxially to the cam shaft 11 by means of bolts and rotates together with the cam shaft 11 around the same axis O as that of the rotating shaft 14. Formed on the output shaft 36 is an engagement 37 in the form of a circular ring plate to center about the axis O. A plurality of engagement holes 38 are formed on the engagement 37 to be spaced at regular intervals about the axis O. Provided on the planetary gear 35 are engagement projections 39 disposed in locations opposed to the respective engagement holes 38. A plurality of the engagement projections 39 are arranged at regular intervals about the eccentric axis P. The engagement projections 39 project toward the output shaft 36 to enter into the corresponding engagement holes 38.

When the rotating shaft 14 does not rotate relative to the sprocket 32, the planetary gear 35 together with the sprocket 32 and the eccentric shaft 34 rotates in a clockwise direction shown in FIG. 4 while maintained in a position meshing with the ring gear 33, as the crankshaft rotates. At this time, since the engagement projections 39 push inner peripheral walls of the engagement holes 38 in a direction of rotation, the output shaft 36 rotates in the clockwise direction shown in FIG. 4 while maintained in rotational phase relative to the sprocket 32. Thereby, the cam shaft is maintained in rotational phase relative to the crankshaft. On the other hand, when an increase in rotational torque causes the rotating shaft 14 to rotate relative to the sprocket 32 in the counterclockwise direction shown in FIG. 4, planetary movements cause the planetary gear 35 to rotate relative to the eccentric shaft 34 in the clockwise direction shown in FIG. 4. At this time, since forces, with which the engagement projections 39 push the engagement holes 38 in the direction of rotation, increase, the output shaft 36 advances angularly relative to the sprocket 32. Thereby, the rotational phase of the cam shaft relative to the crankshaft changes to an angularly advancing side. On the other hand, when an increase in rotational torque causes the rotating shaft 14 to rotate relative to the sprocket 32 in the clockwise direction shown in FIG. 4, planetary movements cause the planetary gear 35 to rotate relative to the eccentric shaft 34 in the counterclockwise direction shown in FIG. 4. At this time, since the engagement projections 39 push the engagement holes 38 in a direction opposed to rotation, the output shaft 36 lags angularly relative to the sprocket 32. Thereby, the rotational phase of the cam shaft relative to the crankshaft changes to an angularly lagging side.

Subsequently, the motor drive apparatus 100 will be described in detail.

The motor drive apparatus 100 comprises the bridge circuit 110, an electric source 120, a control circuit 130, etc. In addition, while the respective elements 110, 120, 130 are schematically shown in FIG. 2 as being disposed outside the motor 12, locations, in which the respective elements 110, 120, 130 are installed, can be appropriately set. For example, the bridge circuit 110 may be installed inside the motor 12, and the electric source 120 and the control circuit 130 may be installed outside the motor 12.

Figure 6:
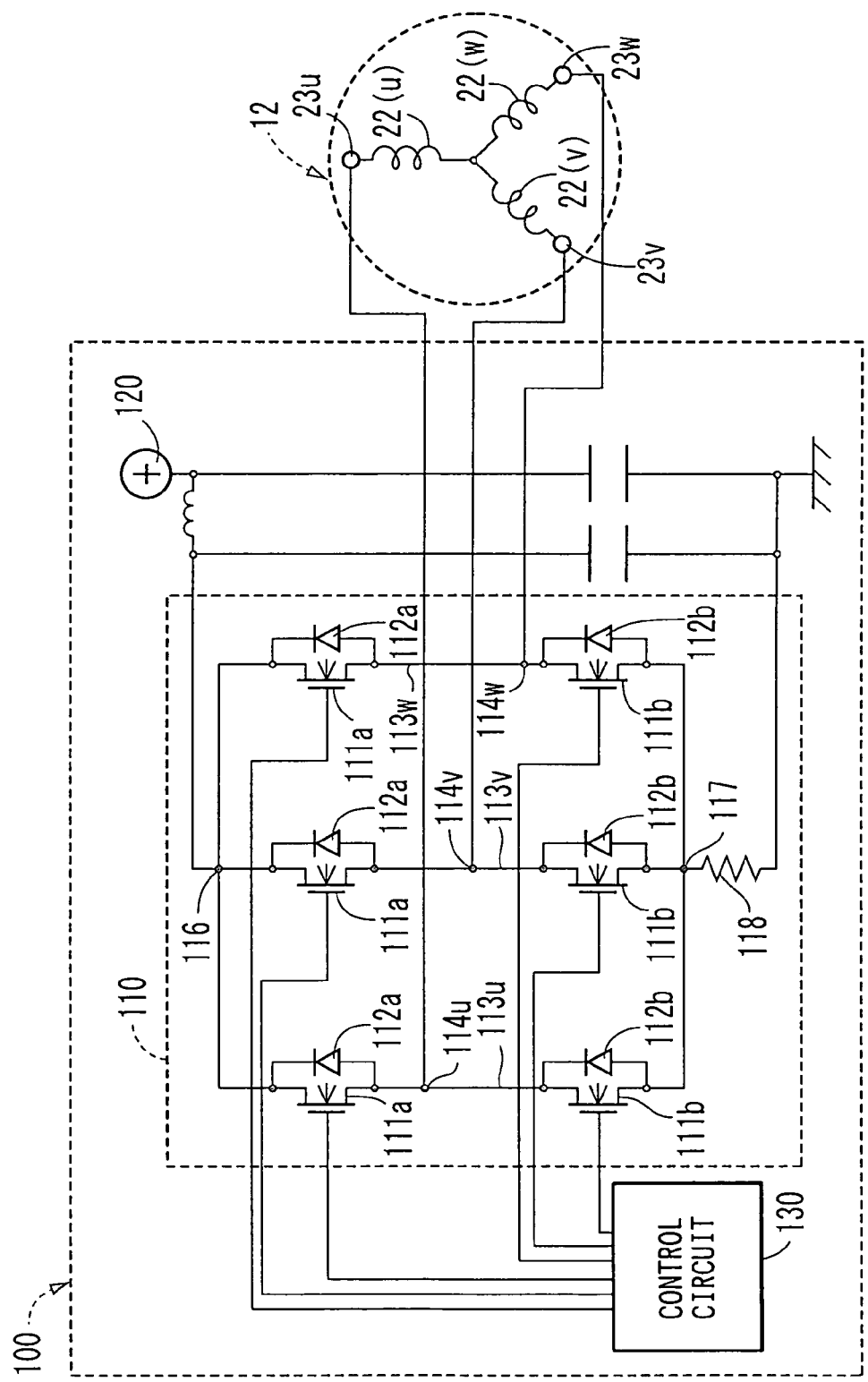
FIG. 6 is a block diagram schematically showing a modification of the motor drive apparatus according to the first exemplary embodiment.

As shown in FIG. 5, the bridge circuit 110 comprises three rows of arms that comprise two switching elements 111a, 111b connected in series to each other and two diodes 112a, 112b connected in parallel to corresponding switching elements 111a, 111b. The windings 22u, 22v, 22w, respectively, are connected via terminals 23u, 23v, 23w to points 114u, 114v, 114w of interconnection of the switching elements 111a, 111b in the respective arms 113u, 113v, 113w. The respective arms 113u, 113v, 113w are connected mutually in parallel to the electric source 120 that comprises a DC power source. Concretely, one ends of the respective arms 113u, 113v, 113w are connected together at a first point 116 of connection and a positive electrode of the electric source 120 is connected to the first point 116 of connection. Also, the other ends of the respective arms 113u, 113v, 113w are connected together at a second point 117 of connection and a negative electrode of the electric source 120 is connected to the second point 117 of connection via a load resistive element 118. Thereby, the first point 116 of connection is higher in electric potential than the second point 117 of connection. In addition, a load resistive element 118 is connected to a detection circuit (not shown) that detects an electric current passing through the load resistive element, and can also be connected between the first point 116 of connection and the positive electrode of the electric source 120. Also, as in a modification shown in FIG. 6, the first point 116 of connection may be connected to the positive electrode of the electric source 120 and the second point 117 of connection may be grounded, or the second point 117 of connection may be connected to the positive electrode of the electric source 120 and the first point 116 of connection may be grounded. In the both cases, the first point 116 of connection or the second point 117 of connection can be connected via the load resistive element 118 to the electric source 120 or can be grounded.

Field effect transistors are used for the respective switching elements 111a, 111b, and a control circuit 130 is connected to gates of the respective switching elements 111a, 111b. The respective switching elements 111a, 111b is made ON/OFF according to control signals input from the control circuit 130, and when the elements are made ON, an electric current is caused thereby to flow toward the second point 117 of connection from the first point 116 of connection. When the switching element 111a of one arm disposed on a side (that is, a side of upper stage) of the point of interconnection toward the first point 116 of connection and the switching element 111b of a separate arm disposed diagonally of the former switching element and disposed on a side (that is, a side of lower stage) of the point of interconnection toward the second point 117 of connection are made ON together, an electric current flows through two windings 22 that are connected in series to the two switching elements 111a, 111b. For example, when the switching element 111a of the arm 113u and the switching element 111b of the arm 113v are made ON, an electric current is carried to the windings 22u, 22v as indicated by alternate long and two short dashes lines with arrows in FIG. 1A. As shown in FIG. 5, the diodes 112a, 112b in parallel to the switching elements 111a, 111b in the respective arms 113u, 113v, 113w enable an electric current to flow toward the first point 116 of connection from the second point 117 of connection.

The control circuit 130 comprises an electric circuit such as microcomputer, etc. The control circuit 130 controls introduction of an electric current to the motor 12 from the bridge circuit 110. In addition, the control circuit 130 in the embodiment may have the function of controlling, for example, the operation of an engine as well as the function of controlling introduction of an electric current to the motor 12.

Figure 7A:
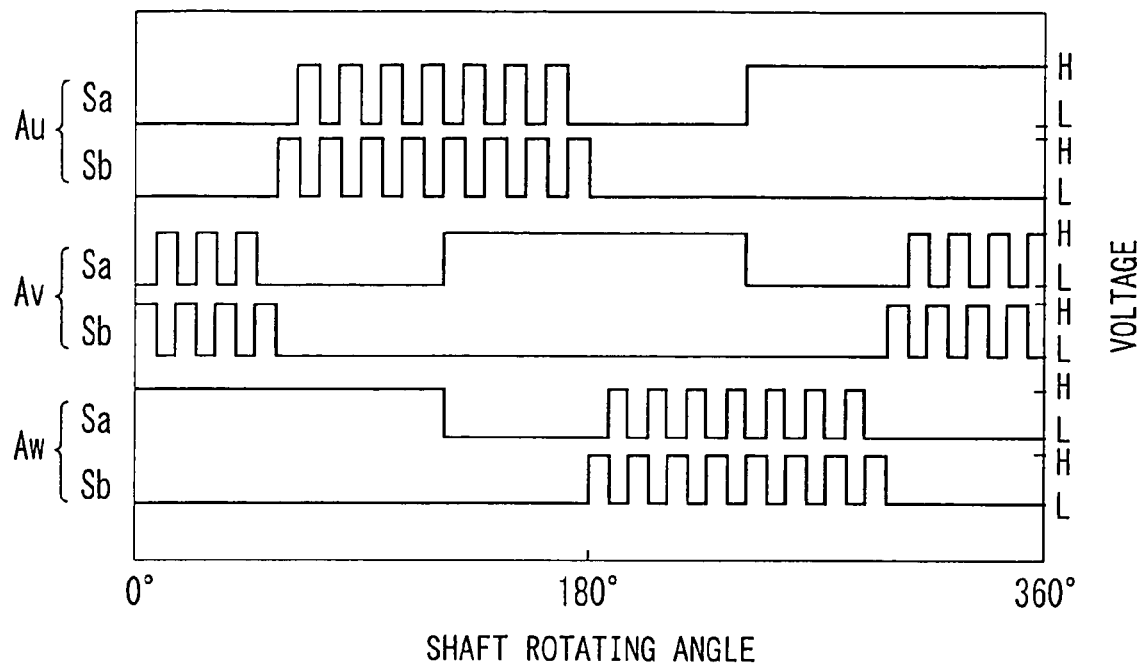
FIG. 7A is a schematic view illustrating control signals input into a bridge circuit by a control circuit in the first exemplary embodiment.

Here, a method of controlling the bridge circuit 110 with the use of the control circuit 130 is described with reference to FIG. 7. In addition, the arms 113u, 113v, 113w, respectively, are abbreviated Au, Av, Aw and the switching elements 111a, 111b, respectively, are abbreviated 5a, 5b in FIG. 7.

The control circuit 130 generates a control signal that is switched in voltage level between high (H) and low (L). The control circuit 130 inputs a high-level control signal into the switching elements 111a, 111b to put the same in an ON state, and inputs a low-level control signal into the switching elements 111a, 111b to put the same in an OFF state. The control circuit 130 switches a control signal that is input into the respective switching elements 111a, 111b, in voltage level as shown in FIG. 7, and so sequentially switches the two switching elements 111a, 111b being made ON. Thereby, an electric current is carried to the respective windings 22u, 22v, 22w at predetermined timings to give a rotational torque to the rotating shaft 14. In addition, when switching of a control signal in voltage level proceeds rightward from leftward on an axis of abscissas in FIG. 7, a rotational torque in a forward direction is given to the rotating shaft 14, and when switching of a control signal in voltage level proceeds leftward from rightward on the axis of abscissas in FIG. 7, a rotational torque in a backward direction is given to the rotating shaft 14.

The control circuit 130 in the embodiment continues to put a control signal being input into one 111a of the two switching elements 111a, 111b being made ON, at a high voltage level when an electric current is carried to a predetermined winding 22, and switches a control signal being input into the other 111b, alternately between high and low voltage levels. Thereby, the control circuit 130 can control ON/OFF of the other 111b of the two switching elements 111a, 111b selected for introduction of an electric current into the predetermined winding 22 by means of the pulse-width modulation (PWM) method. Here, timing, at which the switching element 111b (referred below to as PWM control object element) being an object of PWM control is made ON/OFF, that is, timing, at which a control signal being input into the PWM control object element 111b is switched in voltage level, is determined on the basis of that rotational speed, which is desired to be realized in the motor 12.

Figure 7B:
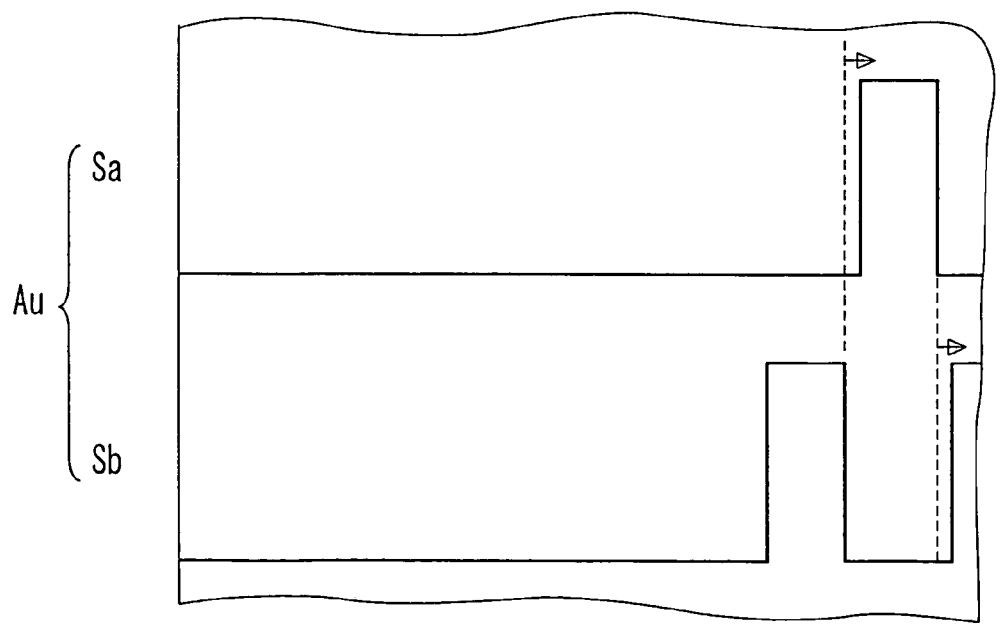
FIG. 7B is an enlarged view showing an essential part in FIG. 7A.

Further, the control circuit 130 switches a control signal being input into a separate switching element (referred below to as the same arm element) 111a of the same arm as that, on which the PWM control object element 111b is disposed, between high and low voltage levels in the reverse order to that in the case of the PWM control object element 11b. At this time, the control circuit 130 switches a control signal being input into the same arm element 111a from a low voltage level to a high voltage level after switching a control signal being input into the PWM control object element 111b from a high voltage level to a low voltage level as shown in FIG. 7B. Thereby, the same arm element 111a shifts from an OFF state to an ON state at a later timing than that, at which the PWM control object element 111b shifts from an ON state to an OFF state. Also, likewise, the control circuit 130 switches a control signal being input into the PWM control object element 111b from a low voltage level to a high voltage level after switching a control signal being input into the same arm element 111a from a high voltage level to a low voltage level as shown in FIG. 7B. Thereby, the PWM control object element 111b shifts from an OFF state to an ON state at a later timing than that, at which the same arm element 111a shifts from an ON state to an OFF state. In this manner, the switching elements 111a, 111b constituting the same arm are prevented from being made ON at the same time whereby it is possible to prevent a situation that an excess electric current passes through the PWM control object element 111b to cause failure. In the embodiment, the switching element 111b of the respective arms 113u, 113v, 113w successively selected, as the PWM control object element, by switching of a control signal in voltage level correspond to "electric introduction stoppage element", and the control circuit 130 corresponds to "control means". In addition, it is possible to successively select the switching element 111a of the respective arms 113u, 113v, 113w as the PWM control object element.

An electric current flowing through the bridge circuit 110 will be described by, for example, the case where the control method described above is used to carry an electric current to the windings 22u, 22v. First, when the switching element 111a on the arm 113u and the switching element 111b on the arm 113v that is a PWM control object element are made ON and the switching element 111a on the arm 113v that is an element on the same arm is made OFF, a PWM control electric current flows through a path that connects the switching element 111a on the arm 113u, the windings 22u, 22v, and the switching element 111b on the arm 113v together, as indicated by the alternate long and two short dashes lines with the arrows in FIG. 1A. Thereafter, while the switching element 111a on the arm 113u is kept in an ON state, the switching element 111b on the arm 113v that is a PWM control object element is made OFF and the switching element 111a on the arm 113v that is an element on the same arm is made ON. Thereby, as indicated by the alternate long and two short dashes lines with the arrows in FIG. 1B, a circulating electric current flows through a path that connects the switching element 111a on the arm 113u, the windings 22u, 22v, and the switching element 111a on the arm 113v together. At this time, the circulating electric current does not flow substantially through the diode 112a on the arm 113v.

According to the first embodiment, since the circulating electric current flows through two predetermined switching elements 111a, 111b, heat generated by the switching elements 111a, 111b can be suppressed by the use of elements of relatively low resistance as the switching elements 111a, 111b. For example, when elements of 0.005 Ω are used for the switching elements 111a, 111b, heat loss caused when a circulating electric current of 40 A is generated amounts to 8 W. The heat loss assumes a considerably small value as compared with the case where a circulating electric current flows through a diode in the conventional art. Accordingly, even when switching of ON/OFF of the switching elements 111a, 111b is increased in frequency, the motor drive apparatus 100 becomes hard to get out of order due to heat generated by the switching elements 111a, 111b. Thereby, a highly accurate PWM control can be realized to freely change a rotational torque of the motor 12, so that the valve timing regulating performance by the valve timing regulating device 10 is improved.

(Second Embodiment)

Figure 8:
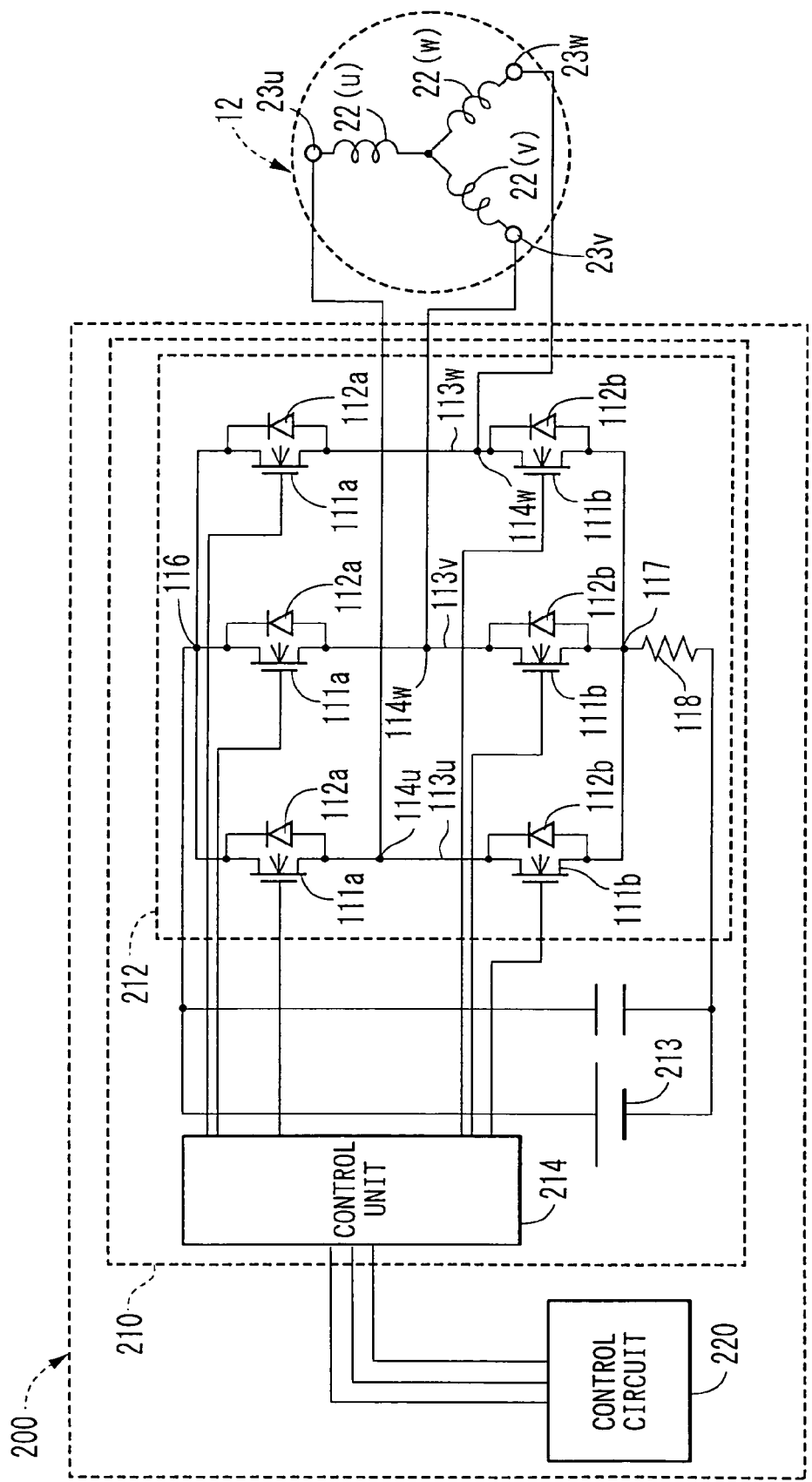
FIG. 8 is a block diagram schematically showing a motor drive apparatus according to a second exemplary embodiment.

A second embodiment of the invention comprises a modification of the valve timing regulating device according to the first embodiment, and a motor drive apparatus of the modification is shown in FIG. 8. A motor drive apparatus 200 according to the second embodiment comprises a driving circuit 210, a control circuit 220, etc.

The driving circuit 210 comprises an electric circuit that comprises a bridge unit 212 and an electric source unit 213 that are similar to the bridge circuit 110 and the electric source 120 according to the first embodiment, and a control unit 214 having the same function as that of the control circuit 130 according to the first embodiment. Here, the control unit 214 generates a control signal similar to that in the first embodiment, on the basis of a command signal received from a control circuit 220 connected thereto. The control circuit 220 comprising an electric circuit such as microcomputer, etc. may have the function of controlling, for example, the operation of an engine as well as the function of generating, as a command signal, a signal for realization of a rotational speed desired in the motor 12, a signal for realization of a direction of rotation desired in the motor 12, etc.

The second embodiment constructed in this manner produces a similar effect to that in the first embodiment.

In the second embodiment, the bridge unit 212 corresponds to "bridge circuit", the electric source unit 213 corresponds to "electric source", and at least the control unit 214 out of the control unit 214 and the control circuit 220 corresponds to "control means".

(Third Embodiment)

FIGS. 9 to 12 show an essential part of a valve lift regulating device as "valve opening and closing control device" according to a third embodiment of the invention. A valve lift regulating device 300 according to the third embodiment makes use of a rotational torque of a motor 320 driven by a motor drive apparatus 370 to control opening and closing of an intake valve of an engine, thereby regulating a maximum valve lift of the intake valve.

Concretely, the valve lift regulating device 300 comprises an actuator 310 that drives a control shaft 330 linearly in an axial direction, and lift regulating means (not shown) that regulates a maximum valve lift of the intake valve on the basis of a position of the control shaft 330 in an axial direction.

Figure 9:
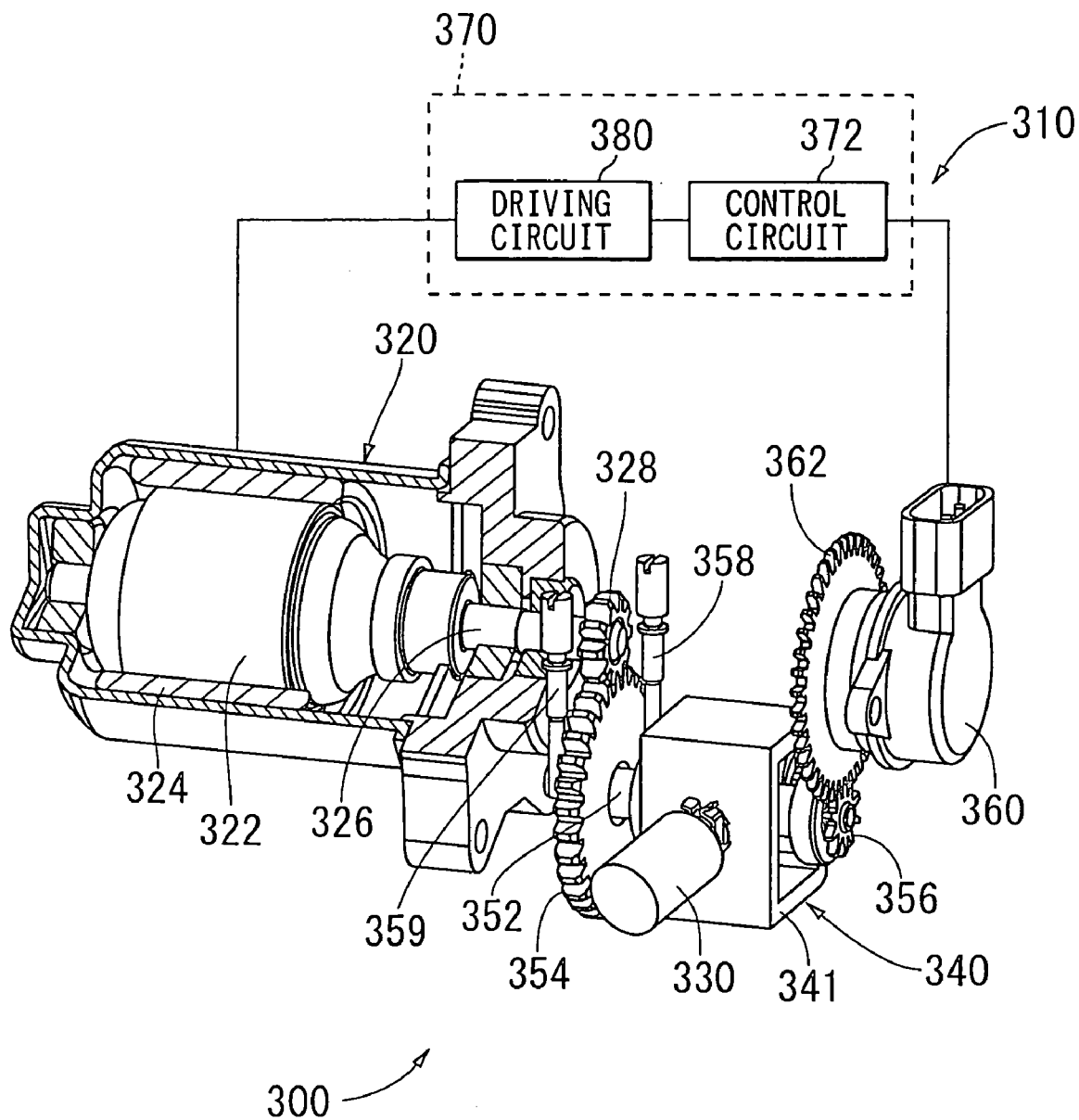
FIG. 9 is a partial, cross sectional, perspective view showing an essential part of a valve lift regulating device according to a third exemplary embodiment.

As shown in FIG. 9, the actuator 310 comprises a motor 320, the control shaft 330, a transmission unit 340, a drive cam 350 (see FIG. 11), an angle sensor 360, and the motor drive apparatus 370.

The motor 320 is a DC brush motor to comprise a rotor 322, around which windings are wound, and a permanent magnet 324 that covers an outer edge of the rotor 322. A motor gear 328 is fixed to an end of a rotating shaft 326, which rotates together with the rotor 322 in the motor 320, to be rotatable integral therewith.

Figure 10:
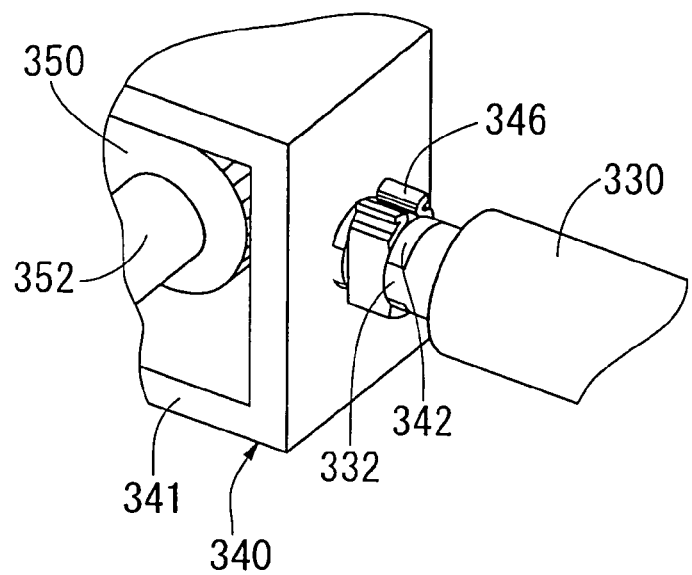
FIG. 10 is a perspective view showing an essential part of an actuator according to the third exemplary embodiment.
Figure 11:
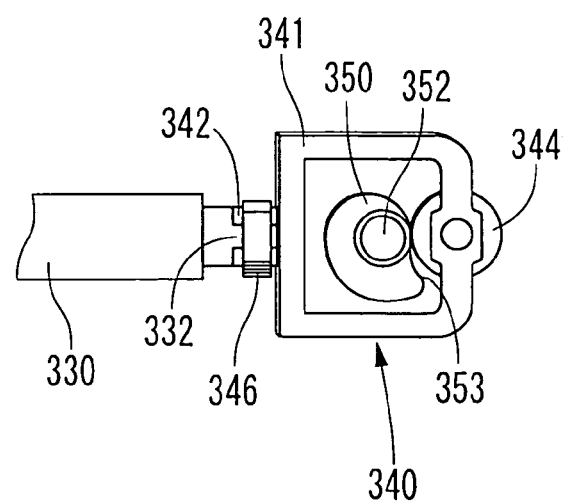
FIG. 11 is a side view showing an essential part of the actuator according to the third exemplary embodiment.

The control shaft 330 is joined at one end thereof to a support frame 341 of the transmission unit 340 and at the other end thereof to the lift regulating means. An axial direction of the control shaft 330 is set to a direction perpendicular to the rotating shaft 326 of the motor 320. As shown in FIGS. 10 and 11, a joint portion 332 being one end of the control shaft 330 overlaps and fits onto a joint portion 342 of the support frame 341 in a direction perpendicular to the control shaft 330. The joint portions 332, 342 are prevented by a clip 346 from disengaging from each other.

The transmission unit 340 comprises the box-shaped support frame 341 and a roller 344 supported by the support frame 341 on a side opposed to the control shaft 330 to be reversely rotatable.

A cam shaft 352 of a drive cam 350 is inserted inside the support frame 341 to become in parallel to the rotating shaft 326 of the motor 320 and to be reversely rotatable. A cam surface 353 is formed on an outer peripheral surface of the drive cam 350 to come into sliding contact with the roller 344. As shown in FIG. 9, cam gears 354, 356, respectively, are fixed to both ends of the cam shaft 352 to be able to rotate therewith. The motor gear 328 and the cam gear 354 mesh with each other to constitute reduction means. Two projections (not shown), respectively, provided on the cam gear 354 are latched on latch members 358, 359 whereby a range of a rotating angle of the cam gear 354 is restricted.

The angle sensor 360 comprises a sensor gear 362 that meshes with the cam gear 356. The angle sensor 360 detects, by means of a hall element, etc. a rotating angle of a sensor rotating member (not shown) that rotates together with the sensor gear 362. The angle sensor 360 is connected to the motor drive apparatus 370 to transmit a detection signal of a rotating angle to the motor drive apparatus 370.

The motor drive apparatus 370 comprises a control circuit 372, a driving circuit 380, etc. The control circuit 372 receives various detection signals of engine speed, accelerator opening degree, etc. as well as a detection signal of the angle sensor 360 and generates a command signal on the basis of the received detection signals. Also, the control circuit 372 may have the function of controlling, for example, the operation of an engine as well as the function of generating a command signal. The driving circuit 380 receives a command signal generated by the control circuit 372 and drivingly carries an electric current to the motor 320 on the basis of the received command signal.

Subsequently, an operation of the valve lift regulating device 300 will be described. When the driving circuit 380 carries an electric current to the motor 320 to rotate the same, a rotational torque of the motor 320 is transmitted to the drive cam 350 via the motor gear 328 and the cam gear 354. When the drive cam 350 rotates coming into sliding contact with the roller 344, the support frame 341 that supports the roller 344 linearly reciprocates together with the control shaft 330 in the axial direction of the control shaft 330. At this time, the lift regulating means regulates a maximum valve lift of the intake valve in accordance with a position of the control shaft 330 in the axial direction, the control shaft moving following a cam profile of the cam surface 353 of the drive cam 350.

When the motor 320 stops, a biasing force exerted by the lift regulating means causes the control shaft 330 to be held in a position corresponding to a lift of the intake valve at the time of engine starting.

Subsequently, details of the motor drive apparatus 370 will be described.

Figure 12:
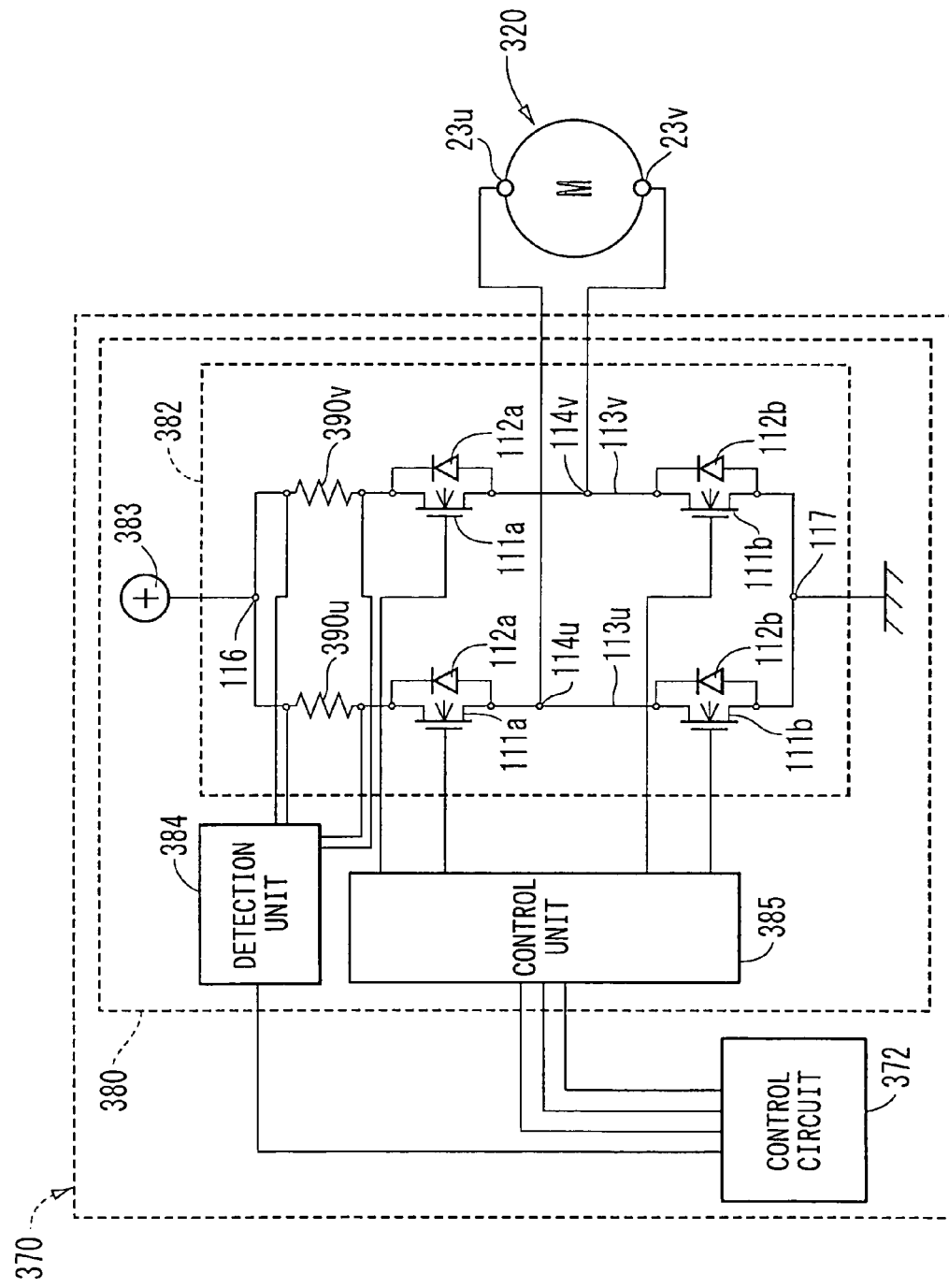
FIG. 12 is a block diagram schematically showing a motor drive apparatus according to the third exemplary embodiment.

The control circuit 372 of the motor drive apparatus 370 shown in FIG. 12 comprises an electric circuit such as microcomputer, etc. The control circuit 372 generates, as a command signal, a signal for realization of a rotational speed desired in the motor 320, a signal representative of a direction of rotation that is desired to be realized in the motor 320, etc.

The driving circuit 380 of the motor drive apparatus 370 comprises an electric circuit that comprises a bridge unit 382, an electric source unit 383, a detection unit 384, and a control unit 385. The bridge unit 382 comprises a circuit obtained by omitting the arm 113w from the bridge circuit 110 in the first embodiment, that is, a H bridge circuit having two rows of arms 113u and 113v. In the bridge unit 382, a first point 116 of connection is connected to a positive electrode of an electric source unit 383 that comprises a DC electric source, and a second point 117 of connection is grounded while the first and second points 116, 117 of connection, respectively, may be connected to a positive electrode and a negative electrode of the electric source unit 383 as in the bridge circuit 110 in the first embodiment. Further, load resistive elements 390u, 390v are arranged on the respective arms 113u, 113v between switching elements 111a directly close to the first point 116 of connection and the first point 116 of connection. The detection unit 384 is connected to both ends of the respective load resistive elements 390u, 390v to detect an electric current flowing through the respective load resistive elements 390u, 390v. The detection unit 384 is connected to the control circuit 372 and transmits to the control circuit 372 monitor signals representative of detection results of an electric current flowing through the respective load resistive elements 390u, 390v. In the third embodiment, the bridge unit 382 corresponds to "bridge circuit", the electric source unit 383 corresponds to "electric source", and the detection unit 384 corresponds to "detection means".

The control unit 385 is connected to gates of the respective switching elements 111a, 111b and generates control signals that make the respective switching elements 111a, 111b ON/OFF. The control unit 385 in the embodiment inputs high-level control signals into the switching element 111a of the arm 113u and the switching element 111b of the arm 113v disposed diagonally of the former switching element to thereby make the switching elements 111a, 111b ON to impart to the rotating shaft 326 a rotational torque in a forward direction. Also, the control unit 385 inputs high-level control signals into the switching element 111a of the arm 113v and the switching element 111b of the arm 113u disposed diagonally of the former switching element to thereby make the switching elements 111a, 111b ON to impart to the rotating shaft 326 a rotational torque in a rearward direction. The control unit 385 connected to the control circuit 372 determines, on the basis of a command signal received from the control circuit 372, whether a rotational torque in either of forward and rearward directions should be imparted to the rotating shaft 326.

Also, in the case where a rotational torque in either of forward and rearward directions should be imparted to the rotating shaft 326, the control unit 385 switches control signals that are input into the two switching elements 111a, 111b being made ON, in voltage level in the same manner as the control unit 130 in the first embodiment does. Here, timing, at which a control signal being input into the switching element 111b that is a PWM control object element is switched in voltage level, is determined on the basis of a command signal received from the control circuit 372. Furthermore, in the case where a rotational torque in either of forward and rearward directions is imparted to the rotating shaft 326, the control unit 385 switches a control signal that is input into the switching element 111a on the same arm as that, on which the switching element 111b being a PWM control object element is disposed, in voltage level in the same manner as the control unit 130 in the first embodiment does. Accordingly, in the third embodiment, the switching elements 111b of the respective arms 113u, 113v correspond to "electricity introduction stoppage element", and at least the control unit 385 out of the control unit 385 and the control circuit 372 corresponds to "control means".

Here, an electric current flowing through the bridge circuit 382 will be described with respect to, for example, the case where the rotating shaft 326 is rotated in a forward direction. First, when the switching element 111a of the arm 113u and the switching element 111b of the arm 113v that is a PWM control object element are made ON and the switching element 111a of the arm 113v that is an element on the same arm is made OFF, a PWM control electric current flows through a path that connects the switching element 111a on the arm 113u, the windings of the motor 320, and the switching element 111b on the arm 113v together. Thereafter, when the switching element 111a on the arm 113u and the switching element 111a on the arm 113v that is an element on the same arm are made ON and the switching element 11b on the arm 113v that is a PWM control object element is made OFF, a circulating electric current flows through a path that connects the switching element 111a on the arm 113u, the windings of the motor 320, and the switching element 111a on the arm 113v together. Since the circulating electric current does not flow substantially through the diode 112a on the arm 113v, heat generated by the switching elements 111a, 111b can be suppressed by the use of elements of relatively low resistance as the switching elements 111a, 111b. Also, since a circulating electric current flows through the load resistive elements 390u, 390v of the respective arms 113v, 113u, it can be detected by the detection unit 384. Accordingly, when receiving a monitor signal representative of detection results of the circulating electric current, the control circuit 372 can estimate calorific power of the switching elements 111a, 111b generated by the circulating electric current to generate a command signal so as to restrict, for example, the calorific power.

According to the third embodiment, since failure of the motor drive apparatus 370 due to heat generated by the switching elements 111a, 111b becomes hard to occur, a highly accurate PWM control can be realized to freely change a rotational torque of the motor 320. Accordingly, the valve lift regulating device 300 is improved in the function of regulating a maximum valve lift of the intake valve.

Further, according to the third embodiment, when points 114u, 114v of interconnection of the arms 113v, 113u are grounded in a state, in which the switching elements 111a, 111b of the arms 113v, 113u are made ON, excess electric current flows through the switching elements 111a of the arms 113v, 113u. Since the load resistive elements 390u, 390v are arranged on the arms 113u, 113v between the first point 116 of connection that is higher in electric potential than the second point 117 of connection, and the first point 116 of connection, however, such excess electric current can be detected by the detection unit 384. Accordingly, when receiving a monitor signal representative of detection results of the excess electric current, the control circuit 372 generates a command signal so as to, for example, stop introduction of an electric current into the motor 320, thereby enabling avoiding generation of heat from the switching element 111a and hence failure thereof.

(Fourth Embodiment)

Figure 13:
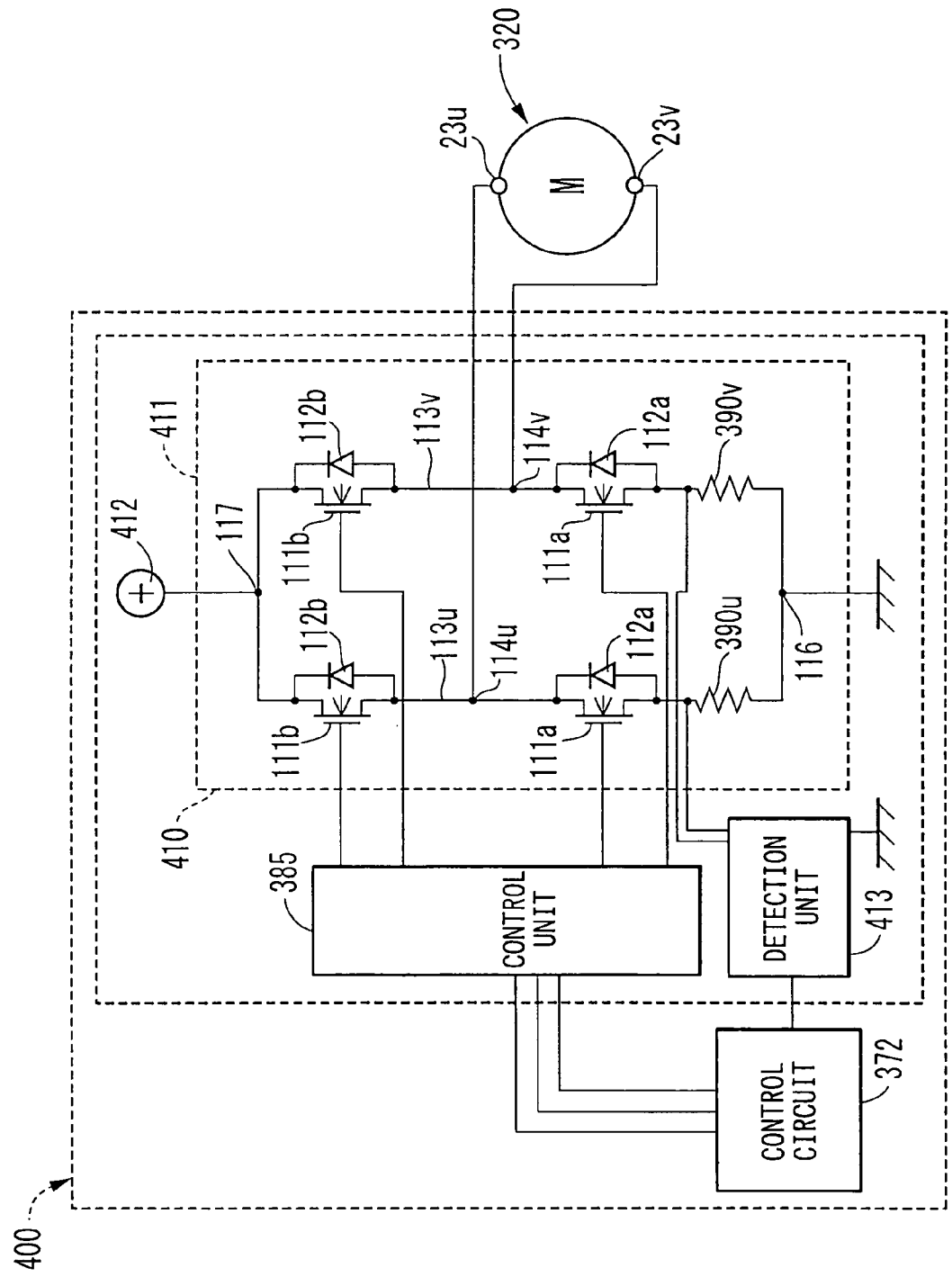
FIG. 13 is a block diagram schematically showing a motor drive apparatus according to a fourth exemplary embodiment.

A fourth embodiment of the invention comprises a modification of the valve lift regulating device according to the third embodiment, and a motor drive apparatus in the fourth embodiment is shown in FIG. 13. A bridge unit 411 of a driving circuit 410 in a motor drive apparatus 400 in the fourth embodiment comprises a H bridge circuit, in which the second point 117 of connection in the bridge unit 382 in the third embodiment is higher in electric potential than the first point 116 of connection. That is, in the driving circuit 410, a first point 116 of connection in the bridge unit 411 is grounded and a second point 117 of connection in the bridge unit 411 is connected to a positive electrode of an electric source unit 412. However, diodes 112a, 112b in the present embodiment are arranged in a manner to allow an electric current to flow toward the second point 117 of connection from the first point 116 of connection. A detection unit 413 of the driving circuit 410 is connected to high-electric-potential sides of respective load resistive elements 390u, 390v and is grounded. Thereby, the detection unit 413 can detect an electric current flowing through the respective load resistive elements 390u, 390v, of which low-electric-potential sides are grounded via the first point 116 of connection.

According to the fourth embodiment, ON/OFF of respective switching elements 111a, 111b on respective arms 113u, 113v is controlled in the same manner as in the third embodiment. Accordingly, since generation of heat from the switching elements 111a, 111b is suppressed according to the same principle as that in the third embodiment and failure of the motor drive apparatus 400 becomes hard to occur, the function of regulating a maximum valve lift of the intake valve is improved.

In the fourth embodiment, the bridge unit 411 corresponds to "bridge circuit", the electric source unit 412 corresponds to "electric source", and the detection unit 413 corresponds to "detection means".

While the several embodiments of the invention have been described heretofore, it should not be interpreted that the invention is limited thereto.

For example, while field effect transistors are used for the switching elements in the first to fourth embodiments, bipolar transistors, etc. may be used for the switching elements.

Figure 14:
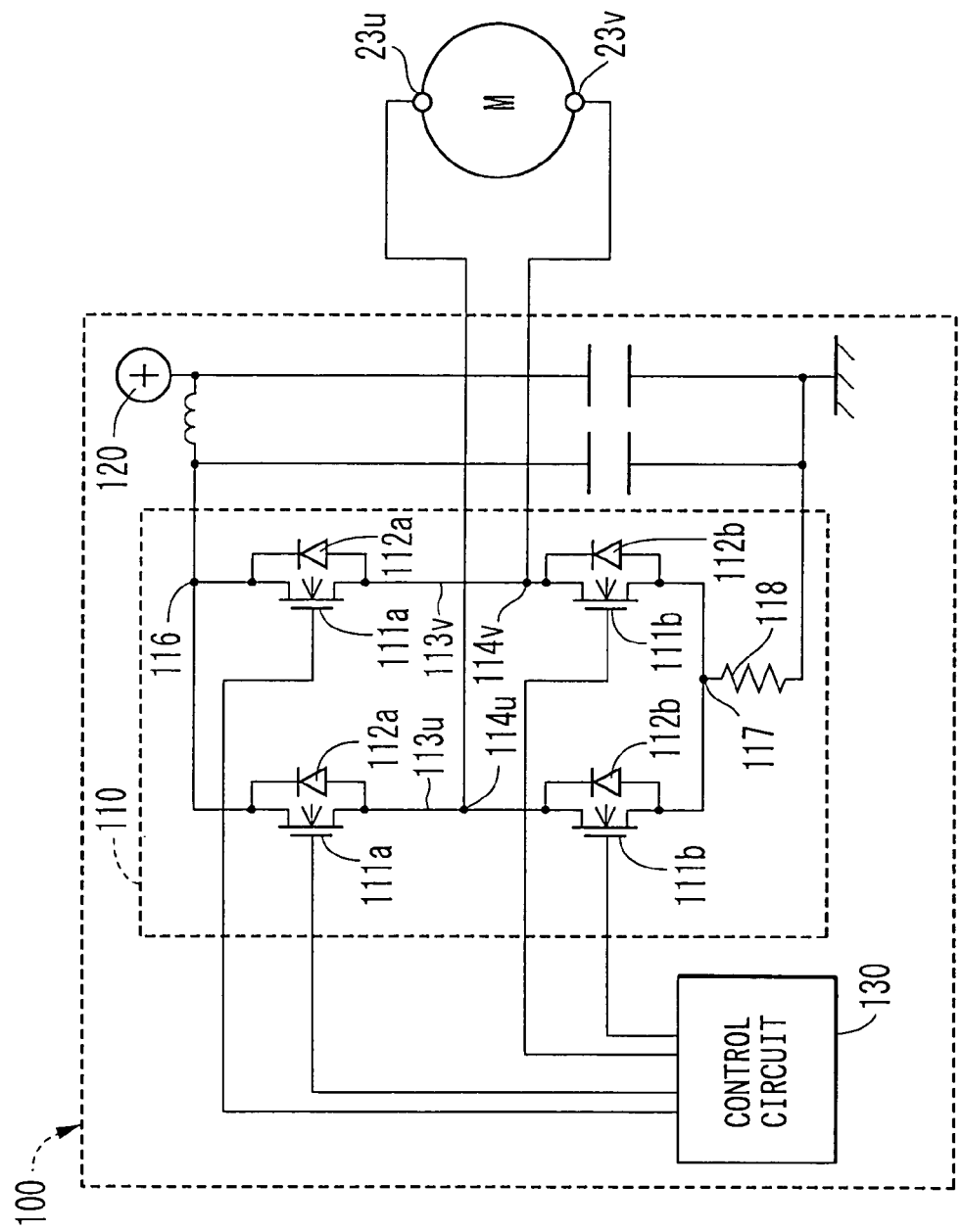
FIG. 14 is a block diagram schematically showing a modification of the motor drive apparatus according to the first exemplary embodiment.

Also, the first and second embodiments have been described with respect to an example, in which the invention is applied to the valve timing regulating device provided with the motor drive apparatus that drives a three-phase motor. In contrast, the invention may be applied to a valve timing regulating device provided with a motor drive apparatus that drives a multi-phase motor or a DC brush motor except the three-phase motor. In addition, in the case where the invention is applied to a valve timing regulating device provided with a motor drive apparatus that drives a multi-phase motor, a bridge circuit (bridge unit) of the motor drive apparatus is constructed to have arms in rows, the number of which corresponds to the number of phases of a motor, and ON/OFF of switching elements on the respective arms is controlled in the manner as in the first embodiment. In the case where the invention is applied to a valve timing regulating device provided with a motor drive apparatus that drives a DC brush motor, a bridge circuit (bridge unit) of the motor drive apparatus is constructed to have two rows of arms as in the modification of the first embodiment shown in FIG. 14, and ON/OFF of switching elements on the respective arms is controlled in the same manner as in the third embodiment. Alternatively, in the case where the invention is applied to a valve timing regulating device provided with a motor drive apparatus that drives a DC brush motor, the motor drive apparatus can be constructed in the same manner as in the third or fourth embodiment.

Further, the third and fourth embodiments have been described with respect to an example, in which the invention is applied to the valve lift regulating device provided with the motor drive apparatus that drives a DC motor. In contrast, the invention may be applied to a valve timing regulating device provided with a motor drive apparatus that drives a multi-phase motor. In addition, in the case where the invention is applied to a valve lift regulating device provided with a motor drive apparatus that drives a multi-phase motor, a bridge circuit (bridge unit) of the motor drive apparatus is constructed to have arms in rows, the number of which corresponds to the number of phases of a motor, and ON/OFF of switching elements on respective arms is controlled in the manner as in the first embodiment.

Furthermore, according to the third and fourth embodiments, the load resistive elements are provided between the first point of connection that connects the respective arms together, and the switching elements directly close to the first point of connection. In contrast, as described in the first embodiment, the third and fourth embodiments may be modified such that the first or second point of connection that connects the respective arms together is connected to an electric source unit via a load resistive element, or the third and fourth embodiments may be modified such that the first or second point of connection is grounded via a load resistive element.

In addition, the third and fourth embodiments have been described with respect to an example, in which the invention is applied to the valve lift regulating device that regulates a maximum valve lift of the intake valve. In contrast, the invention may be applied to a valve lift regulating device that regulates a maximum valve lift of an exhaust valve.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve opening and closing control device making use of a rotational torque of a motor driven by a motor drive apparatus to control valve opening and closing of an internal combustion engine, the motor drive apparatus comprising:

an electric source;

a bridge circuit comprising a plurality of rows of arms comprising two switching elements connected in series to each other and two diodes connected in parallel to corresponding switching elements, the respective arms being connected in parallel to the electric source, the motor having windings thereof connected to points of interconnection of the two switching elements on the respective arms, and control means for controlling ON/OFF of the switching elements, and wherein after putting the switching element on one of the two rows of arms in an ON state to carry an electric current to the windings, the control means causes an electricity introduction stoppage element that is one of the two switching elements put in an ON state, to be put in an OFF state and causes the separate switching element on the same arm as that, on which the electricity introduction stoppage element is disposed, to be put in an ON state, wherein after putting the switching element on one of the two rows of arms in an ON state to carry an electric current to the windings, the control means controls ON/OFF of the switching element selected as the electricity introduction stoppage element by means of a pulse-width modulation method.

2. The valve opening and closing control device according to claim 1, wherein the control means puts the separate switching element on the same arm as that, on which the electricity introduction stoppage element is disposed, in an ON state at later timing than that, at which the electricity introduction stoppage element put in an ON state is put in OFF state.

3. The valve opening and closing control device according to claim 1, wherein the switching elements comprise a field effect transistor.

4. The valve opening and closing control device according to claim 1, wherein the motor drive apparatus comprises:

the bridge circuit, in which one ends of the respective arms are connected together at a first point of connection, the other ends of the respective arms are connected together at a second point of connection, and the respective arms comprise a load resistive element between the switching element close to the first point of connection and the first point of connection, and detection means that detects an electric current flowing through the load resistive element of the respective arms.

5. The valve opening and closing control device according to claim 4, wherein the first point of connection is higher in electric potential than the second point of connection.

6. The valve opening and closing control device according to claim 1, wherein valve timing of an internal combustion engine is regulated.

7. The valve opening and closing control device according to claim 1, wherein a maximum valve lift in an internal combustion engine is regulated.

8. The valve opening and closing control device according to claim 2, wherein the motor drive apparatus comprises:

the bridge circuit, in which one ends of the respective arms are connected together at a first point of connection, the other ends of the respective arms are connected together at a second point of connection, and the respective arms comprise a load resistive element between the switching element close to the first point of connection and the first point of connection, and detection means that detects an electric current flowing through the load resistive element of the respective arms.

9. A motor drive apparatus for controlling windings to thereby rotate an output shaft, the motor drive apparatus comprises:

a bridge circuit comprised of a plurality of arms respectively connected to the windings, wherein each of the plurality of arms comprises a plurality of switching elements connected together in series and a plurality of diodes respectively connected in parallel to the plurality of switching elements, wherein the plurality of arms are connected together at a first point having a first potential and at a second point having a second potential; and a control circuit connected to the switching elements for sequentially switching the switching elements at a predetermined timing to thereby deliver electric current to the windings, wherein the predetermined timing substantially prevents all of the plurality of switching elements on one of the arms from being on at the same time;

wherein the control circuit puts a switching element on one of the plurality of arms in an ON state to carry an electric current to the windings, and causes an electricity introduction stoppage element that is one of the two switching elements put in an ON state, to be put in an OFF state and causes the separate switching element on the same arm as that, on which the electricity introduction stoppage element is disposed, to be put in an ON state, wherein after putting the switching element on one of the plurality of arms in an ON state to carry an electric current to the windings, the control circuit controls ON/OFF of the switching element selected as the electricity introduction stoppage element by means of a pulse-width modulation method.

10. The motor drive apparatus of claim 9, wherein the predetermined timing comprises switching one of the switching elements of one of the plurality of arms on for a predetermined time duration and, while the one of the switching elements is on, alternately switching a first switch of the switching elements of another of the plurality of arms on and off for a time duration and alternately switching a second switch of the switching elements of the another of the plurality of arms on and off for the same time duration so that the second switch is off while the first switch is on.

* * * * *